United States Patent
Kraemer

(10) Patent No.: US 7,284,777 B1
(45) Date of Patent: Oct. 23, 2007

(54) BUCKET LIFTING APPARATUS AND METHOD

(76) Inventor: Kevin P. Kraemer, 2462 Highway 182, Raceland, LA (US) 70394

( * ) Notice: Subject to any disclaimer, the term of this patent is extended or adjusted under 35 U.S.C. 154(b) by 209 days.

(21) Appl. No.: 11/154,332

(22) Filed: Jun. 17, 2005

(51) Int. Cl.
B65G 7/12 (2006.01)

(52) U.S. Cl. .................. 294/31.2; 294/165

(58) Field of Classification Search .......... 294/15, 294/27.1, 31.2, 119.2, 154, 165; 248/311.2, 248/311.3; 215/396
See application file for complete search history.

(56) References Cited

U.S. PATENT DOCUMENTS

| 2,793,905 | A | * | 5/1957 | Hillyer | 294/74 |
|---|---|---|---|---|---|
| 4,486,043 | A | | 12/1984 | Rais | |
| 4,776,550 | A | | 10/1988 | Storey | |
| 4,834,438 | A | * | 5/1989 | Haidet | 294/31.2 |
| D309,072 | S | | 7/1990 | Golkar | |
| 5,316,248 | A | | 5/1994 | Allen | |
| 5,501,497 | A | * | 3/1996 | Holloway | 294/86.4 |
| 5,527,009 | A | | 6/1996 | Allen | |
| 5,531,495 | A | * | 7/1996 | Hohman | 294/31.2 |
| 6,729,665 | B1 | | 5/2004 | Posey et al. | |
| 2003/0184103 | A1 | | 10/2003 | Cauchy | |

* cited by examiner

Primary Examiner—Dean J Kramer

(57) ABSTRACT

A bucket lifting apparatus includes a bucket that has a bottom wall and a peripheral wall. A coupler includes a post. A lower handle is attached to the post. A plurality of arms each has a first end and second end. Each of the first ends is attached to the post. Each of the first and second lateral sides has at least one arm attached thereto. Each of the arms is arcuate. At least one loop is attached to one of the second ends. At least one strap is attached to one of the second ends. The at least one strap has a free end is removably extendable through the at least one loop. The peripheral wall of the bucket is abutted against the arms and the straps are extended around the bucket. The straps are extended through the loops and the bucket is lifted with the coupler.

9 Claims, 4 Drawing Sheets

BUCKET LIFTING APPARATUS AND METHOD

BACKGROUND OF THE INVENTION

1. Field of the Invention

The present invention relates to lifting devices and more particularly pertains to a new lifting device for aiding a person in lifting a large bucket and for increasing the ease of pouring out the contents of the bucket.

2. Description of the Prior Art

The use of lifting devices is known in the prior art. U.S. Pat. No. 6,729,665 describes a device which may be attached to a generally cylindrical body for aiding a person in pouring out the contexts of the cylindrical body. Another type of lifting device is U.S. Pat. No. 4,486,043 securing member adapted for engaging the neck of a bottle while cupping a bottom wall of the bottle. The securing member has a handle attached to thereto lifting the bottle. Yet another such device is found in U.S. Patent Appl. No. 2003/0184103.

While these devices fulfill their respective, particular objectives and requirements, the need remains for a device that aids a person in lifting a conventional 5-gallon bucket. Such bucket typically includes either a handle extending over the top of the bucket or no handle. For this reason, these buckets are difficult to lift and pour when they are filled with food or other materials. The device should be configured to be releasably secured to such a bucket and include means for increasing the ability of a person in pouring out the contents of the bucket.

SUMMARY OF THE INVENTION

The present invention meets the needs presented above by generally comprising a bucket that has a bottom wall and a peripheral wall that is attached to and extending upwardly from the bottom wall. The bottom wall is circular. A coupler is configured to be removably attached to the bucket and includes a post that has a top end, a bottom end, a front side, a back side, a first lateral side and a second lateral side. A lower handle is attached to the back side of the post. A plurality of arms each has a first end and second end. Each of the first ends is attached to one of the first and second lateral sides so that each of the first and second lateral sides has at least one arm attached thereto. Each of the arms is positioned in a plane orientated perpendicular to a longitudinal axis of the post and each is arcuate and curved away from the lower handle. At least one loop is attached to one of the second ends of the at least one arm extending away from the first lateral side such that each of the arms extending away from the first lateral side has a loop attached thereto. At least one strap is attached to one of the second ends of the at least one arm extending away from the second lateral side such that each of the arms extending away from the second lateral side has a strap attached thereto. The at least one strap has a free end is removably extendable through the at least one loop. The peripheral wall of the bucket is abutted against the arms and the straps are extended around the bucket. The straps are extended through the loops so that the bucket is urged toward the post. The bucket is then lifted with the coupler.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
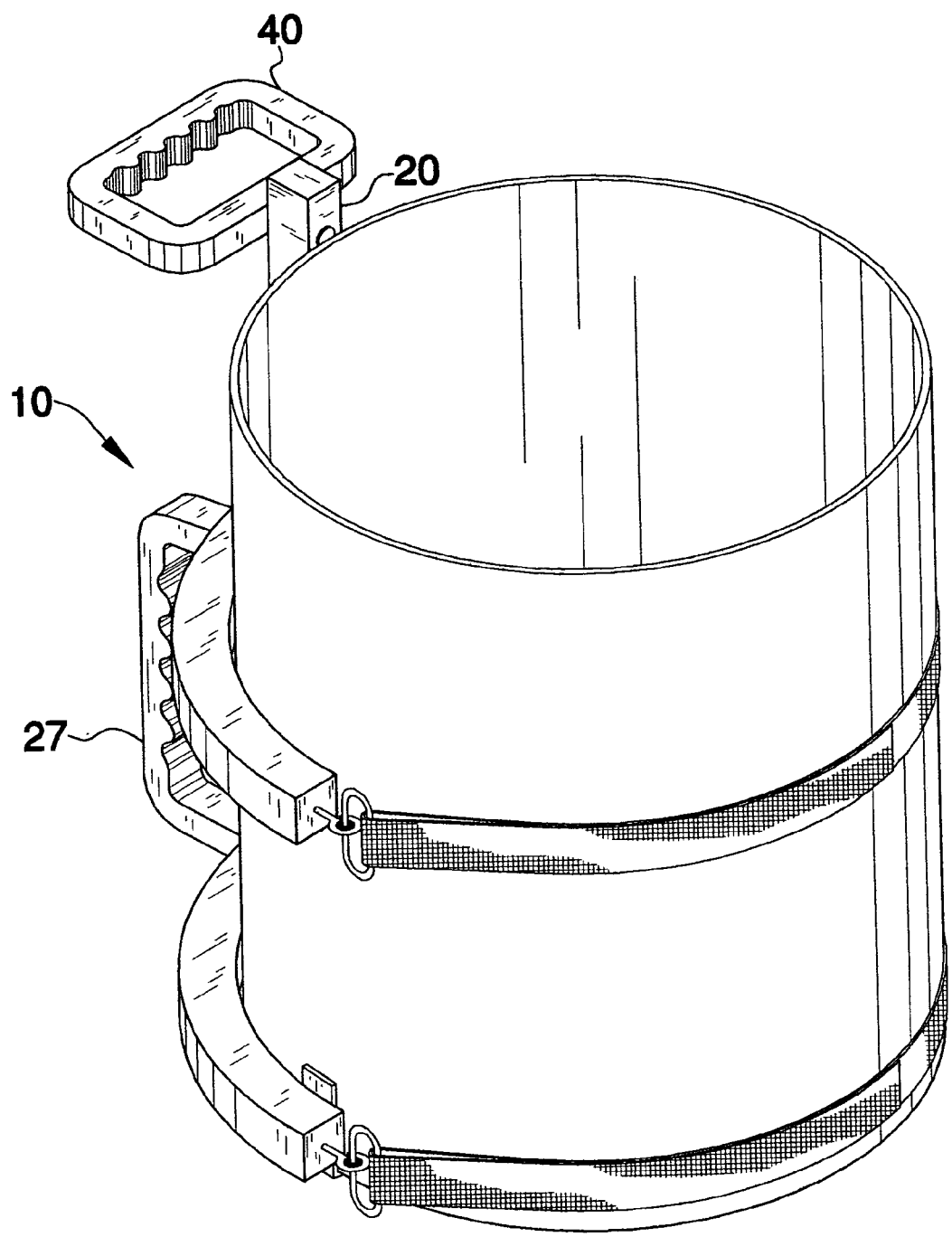
FIG. 1 is a top perspective view of a bucket lifting apparatus and method according to the present invention.
Figure 2:
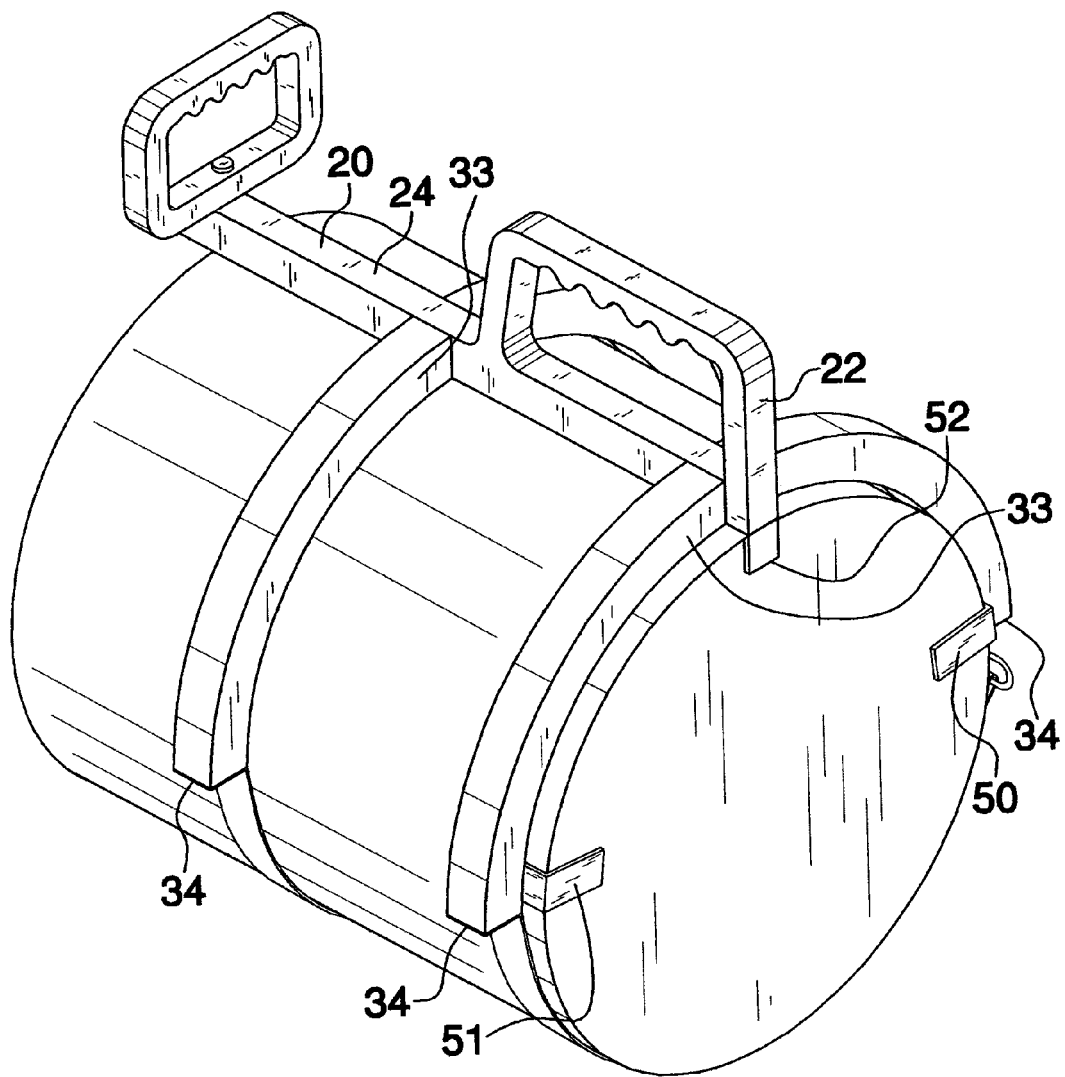
FIG. 2 is a bottom perspective view of the present invention.
Figure 3:
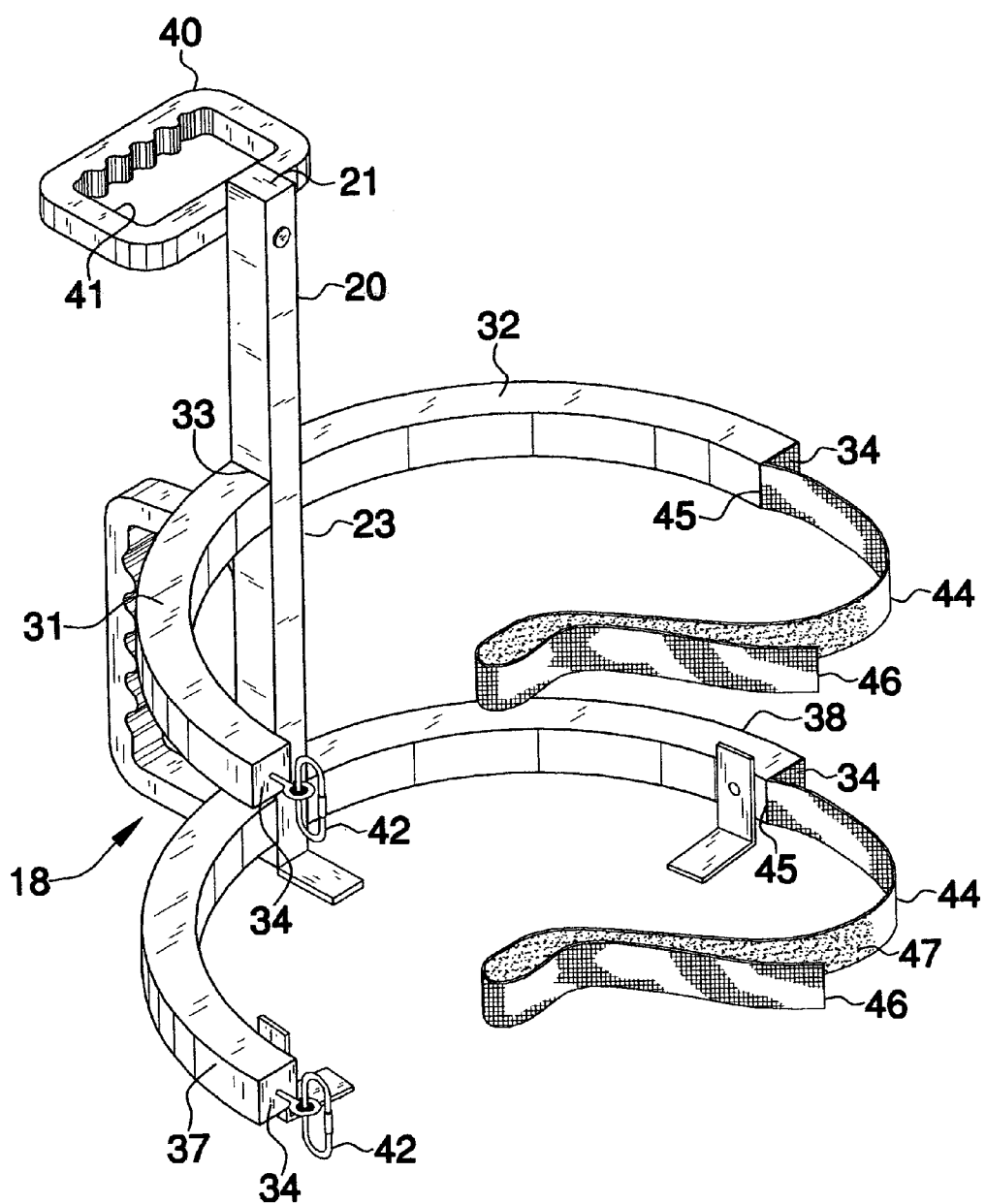
FIG. 3 is a top perspective view of the coupler of the present invention.
Figure 4:
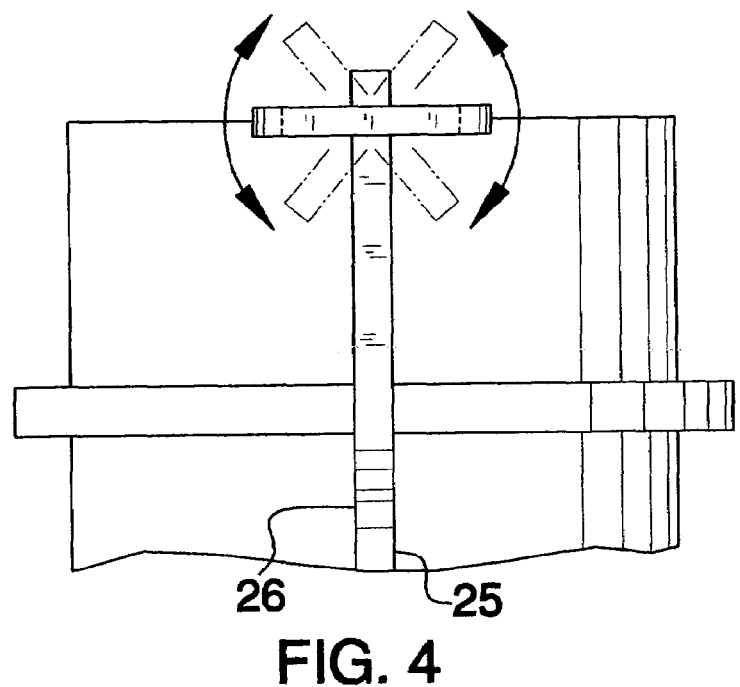
FIG. 4 is a back view of the present invention.
Figure 5:
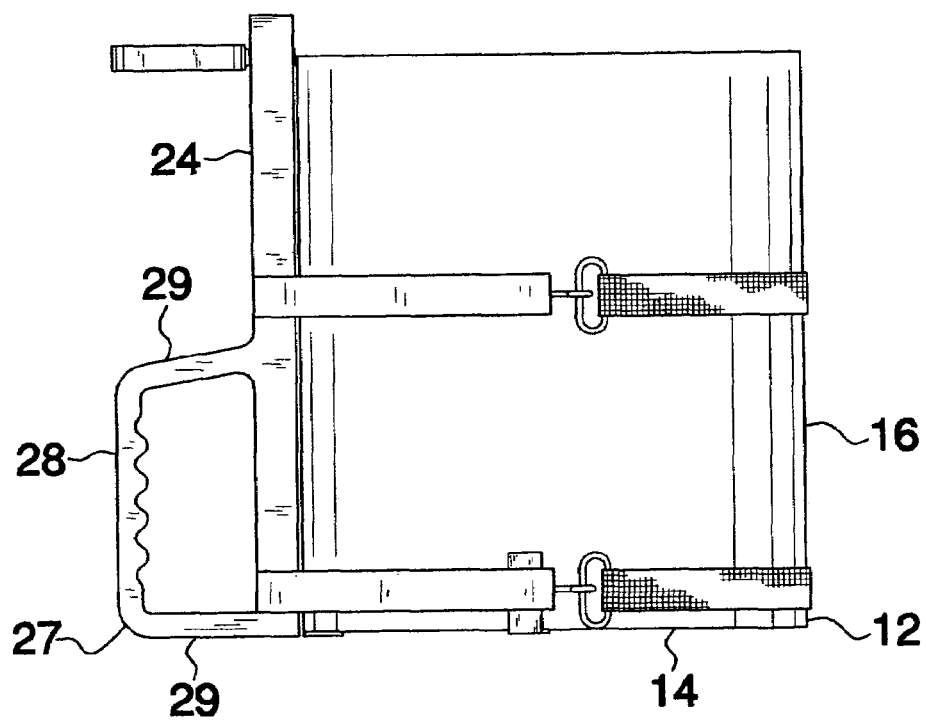
FIG. 5 is a side view of the present invention.

With reference now to the drawings, and in particular to FIGS. 1 through 5 thereof, a new lifting device embodying the principles and concepts of the present invention and generally designated by the reference numeral 10 will be described.

As best illustrated in FIGS. 1 through 5, the bucket lifting apparatus and method 10 generally comprises a bucket 12 that has a bottom wall 14 and a peripheral wall 16 that is attached to and extends upwardly from the bottom wall 14. The bottom wall 16 has a circular shape. The bucket 12 comprises a conventional 5-gallon bucket often used for holding and storing food.

A coupler 18 is provided that is configured to be removably attachable to the bucket 12. The coupler 18 includes a post 20 that has a top end 21, a bottom end 22, a front side 23, a back side 24, a first lateral side 25 and a second lateral side 26. A lower handle 27 is attached to the back side 24 of the post 20 and is spaced from the top end 21. The lower handle 27 includes a grip member 28 that has an upper end and a lower end. Each of a pair of legs 29 is attached to and extends away from one of the upper and lower ends so that the lower handle 27 is generally U-shaped. Each of the legs 29 is attached to the back side 24. A first of the legs 29 is positioned adjacent to the bottom end 22 and a second of the legs 29 is generally positioned between the bottom end 22 and the top end 21.

A first pair of arms 31, 32 each has a first end 33 and a second end 34. Each of the first ends 33 of the first pair of arms 31, 32 is attached to and extends away from one of the first 25 and second 26 lateral sides. The first pair of arms 3 1, 32 is positioned in a plane orientated perpendicular to a longitudinal axis of the post 20. The first pair of arms 31, 32 is positioned generally between the top 21 and bottom 22 ends. The arms of the first pair of arms 31, 32 are arcuate and are curved away from the lower handle 27. A second pair of arms 37, 38 each has a first end 33 and a second end 34. Each of the first ends 33 of the second pair of arms 37, 38 is attached to and extends away from one of the first 25 and second 26 lateral sides. The second pair of arms 37, 38 is positioned in a plane orientated perpendicular to the longitudinal axis of the post 12. The second pair of arms 37, 38 is positioned generally adjacent to the bottom end 22. The arms of the second pair of arms 37, 38 are arcuate and are curved away from the lower handle 27.

An upper handle 40 is rotatably coupled to the back side 24 of the post 20. The upper handle 40 is positioned adjacent to the top end 21 of the post 20. The upper handle 40 comprises a panel that has a hand receiving opening 41 extending therethrough.

A pair of loops 42 is provided. Each of the loops 42 is attached to one of the second ends 34 of the arms 31, 37 that extend away from the first lateral side 25. A pair of straps 44 is also provided. Each of the straps 44 has an attached end 45 and a free end 46. Each of the attached ends 45 is attached to one of the second ends 34 of the arms 32, 38 extending away from the second lateral side 26. Each of the free ends 46 is removably extendable through one of the loops 42. The straps 44 are securable to themselves with hook and loop fasteners 47.

A plurality of tabs is provided. A first of the tabs 50 is attached to a first one 37 of the second pair of arms and a second of the tabs 51 is attached to a second one 38 of the second pair of arms. The first 50 and second 51 tabs generally extend toward each other. A third of the tabs 52 is attached to the bottom end 22 and extends outwardly away from the front side 23 of the post 20.

In use, each of the arms 31, 32, 37, 38 of the first and second pairs of arms are abutted against the peripheral wall 16 and the straps 44 are extended around the bucket 12. The bottom wall 14 is abutted against each of the tabs 50-52. The straps 44 are extended through the loops 42 so that the bucket 12 is urged toward the post 20 and secured in that position. The bucket 12 may then be lifted with the coupler 18. The lower 27 and upper 40 handles aid in lifting the bucket 12 and in dumping any contents out of the bucket 12.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method of lifting and transporting a five gallon bucket, said method comprising the steps of:
    providing a bucket having a bottom wall and a peripheral wall being attached to and extending upwardly from said bottom wall, said bottom wall being circular;
    providing a coupler configured to be removably attached to said bucket, said coupler including;
        a post having a top end, a bottom end, a front side, a back side, a first lateral side and a second lateral side;
        a lower handle being attached to said back side of said post;
        a plurality of arms each having a first end and second end, each of said first ends being attached to one of said first and second lateral sides such that each of said first and second lateral sides has at least one arm attached thereto, each of said arms being positioned in a plane orientated perpendicular to a longitudinal axis of said post and being arcuate and being curved away from said lower handle;
        at least one loop being attached to one of said second ends of at least one arm extending away from said first lateral side such that each of said arms extending away from said first lateral side has a loop attached thereto;
        at least one strap being attached to one of said second ends of at least one arm extending away from said second lateral side such that each of said arms extending away from said first lateral side has a strap attached thereto, said at least one strap having a free end being removably extendable through said at least one loop;
    abutting each of said arms against said peripheral wall and extending said straps around said bucket;
    extending said straps through said loops such that said bucket is urged toward said post; and
    lifting said bucket with said coupler.

2. The method according to claim 1, wherein the lower handle includes a grip member having an upper end and a lower end, each of a pair of legs being attached to and extending away from one of said upper and lower ends such that said lower handle is generally U-shaped, each of said legs being attached to said back side.

3. The method according to claim 2, wherein a first of said legs is positioned adjacent to said bottom end and a second of said legs is generally positioned between said bottom end and said top end.

4. The method according to claim 1, wherein said plurality of arms at least includes a first pair of arms being positioned generally between said top and bottom ends.

5. The method according to claim 4, wherein said plurality of arms further includes a second pair of arms being positioned generally adjacent to said bottom end.

6. The method according to claim 5, wherein said coupler further includes a plurality of tabs, a first of said tabs being attached to a first one of said second pair of arms and a second of said tabs being attached to a second one of said second pair of arms, said first and second tabs generally extending toward each other, said method further including the step of abutting said bottom wall against each of said tabs.

7. The method according to claim 6, further providing a third of said tabs being attached to said bottom end and extending outwardly away from said front side of said post.

8. The method according to claim 1, wherein said coupler further includes an upper handle being rotatably coupled to said back side of said post, said upper handle being positioned adjacent to said top end of said post, said upper handle comprising a panel having a hand receiving opening extending therethrough.

9. A method of lifting and transporting a five gallon bucket, said method comprising the steps of:
    providing a bucket having a bottom wall and a peripheral wall being attached to and extending upwardly from said bottom wall, said bottom wall being circular;
    providing a coupler configured to be removably attached to said bucket, said coupler including;
        a post having a top end, a bottom end, a front side, a back side, a first lateral side and a second lateral side;
        a lower handle being attached to said back side of said post and being spaced from said top end, said lower handle including a grip member having an upper end and a lower end, each of a pair of legs being attached to and extending away from one of said upper and lower ends such that said lower handle is generally U-shaped, each of said legs being attached to said back side, a first of said legs being positioned adjacent to said bottom end and a second of said legs being generally positioned between said bottom end and said top end;

a first pair of arms each having a first end and a second end, each of said first ends of said first pair of arms being attached to and extending away from one of said first and second lateral sides, said first pair of arms being positioned in a plane orientated perpendicular to a longitudinal axis of said post, said first pair of arms being positioned generally between said top and bottom ends, said first pair of arms being arcuate and being curved away from said lower handle;

a second pair of arms each having a first end and a second end, each of said first ends of said second pair of arms being attached to and extending away from one of said first and second lateral sides, said second pair of arms being positioned in a plane orientated perpendicular to said longitudinal axis of said post, said second pair of arms being positioned generally adjacent to said bottom end, said second pair of arms being arcuate and being curved away from said lower handle;

an upper handle being rotatably coupled to said back side of said post, said upper handle being positioned adjacent to said top end of said post, said upper handle comprising a panel having a hand receiving opening extending therethrough;

a pair of loops, each of said loops being attached to one of said second ends of said arms extending away from said first lateral side;

a pair of straps, each of said straps having an attached end and a free end, each of said attached ends being attached to one of said second ends of said arms extending away from said second lateral side, each of said free ends being removably extendable through one of said loops;

a plurality of tabs, a first of said tabs being attached to a first one of said second pair of arms and a second of said tabs being attached to a second one of said second pair of arms, said first and second tabs generally extending toward each other, a third of said tabs being attached to said bottom end and extending outwardly away from said front side of said post;

abutting each of said arms against said peripheral wall and extending said straps around said bucket;

abutting said bottom wall against each of said tabs;

extending said straps through said loops such that said bucket is urged toward said post; and lifting said bucket with said coupler.

\* \* \* \* \*